US008943329B2

(12) United States Patent
Challener et al.

(10) Patent No.: US 8,943,329 B2
(45) Date of Patent: Jan. 27, 2015

(54) METHOD AND APPARATUS FOR SHARING AN INTEGRITY SECURITY MODULE IN A DUAL-ENVIRONMENT COMPUTING DEVICE

(75) Inventors: David Carroll Challener, Raleigh, NC (US); Daryl C. Cromer, Cary, NC (US); Howard J. Locker, Cary, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 734 days.

(21) Appl. No.: 12/748,787

(22) Filed: Mar. 29, 2010

(65) Prior Publication Data

US 2011/0238967 A1  Sep. 29, 2011

(51) Int. Cl.
*G06F 21/00* (2013.01)
*G06F 9/52* (2006.01)
*G06F 21/57* (2013.01)

(52) U.S. Cl.
CPC .............. *G06F 9/52* (2013.01); *G06F 21/575* (2013.01)
USPC ........... 713/189; 713/192; 713/193; 713/194; 726/27

(58) Field of Classification Search
USPC .................... 713/189, 192, 193, 194; 726/27
See application file for complete search history.

(56) References Cited

U.S. PATENT DOCUMENTS

| 2004/0003273 A1* | 1/2004 | Grawrock et al. | 713/193 |
| 2006/0020781 A1* | 1/2006 | Scarlata et al. | 713/100 |
| 2008/0077993 A1* | 3/2008 | Zimmer et al. | 726/27 |
| 2010/0306773 A1* | 12/2010 | Lee et al. | 718/1 |
| 2011/0087896 A1* | 4/2011 | Thom et al. | 713/193 |
| 2011/0191610 A1* | 8/2011 | Agarwal et al. | 713/310 |

OTHER PUBLICATIONS

Trusted Hardware for Partitioned Multicore, published in 2009, Prof. John Kubiatowicz website at Berkeley, http://www.cs.berkeley.edu/~kubitron/courses/cs252-S09/projects/reports/project2_report.pdf.*
"TCPC PC Specific Implementation Specification", Version 1.00, Sep. 9, 2001.
David Safford, "Take Control of TCPA", Linux Journal, Aug. 1, 2003.
"TCG Glossary of Technical Terms", Trusted Computing Group: Glossary of Terms, downloaded on Jan. 28, 2010, http://www.trustedcomputinggroup.org/developers/glossary.

* cited by examiner

*Primary Examiner* — Jeffrey Pwu
*Assistant Examiner* — Thong Truong
(74) *Attorney, Agent, or Firm* — Kunzler Law Group

(57) ABSTRACT

A method and apparatus are disclosed for sharing an integrity security module in a dual-environment computing device. The apparatus include an integrity security module, one or more processors, a detection module and a regeneration module. The one or more processors may have access to the integrity security module and may operate in two distinct operating environments of a dual-environment computing device. The detection module may detect, during an initialization sequence, a power state transition of an operating environment of the dual-environment computing device. The regeneration module may regenerate one or more integrity values from a stored integrity metric log in response to detecting the power state transition of the operating environment of the dual-environment computing device.

17 Claims, 6 Drawing Sheets

METHOD AND APPARATUS FOR SHARING AN INTEGRITY SECURITY MODULE IN A DUAL-ENVIRONMENT COMPUTING DEVICE

BACKGROUND FIELD

The subject matter disclosed herein relates to computing devices and more particularly relates to integrity security modules in computing devices.

DESCRIPTION OF THE RELATED ART

An integrity security module such as a Trusted Platform Module ("TPM") implements security specifications according to principles of Trusted Computing on a computing system. The TPM may measure integrity in a computing system, allowing a particular operating environment in the computing system to be recognizable. The TPM typically measures integrity by obtaining and storing metrics, and digests of those metrics, that measure computing system characteristics.

By design, the metrics measured by the TPM are specific to the operating environment for which the TPM measured the metrics. As a result, if a computing system includes two operating environments sharing a single TPM, the metrics and metric digests for one operating environment typically do not correspond to the other operating environment.

SUMMARY

From the foregoing discussion, there is a need for a method and apparatus for sharing an integrity security module in a dual-environment computing device. Beneficially, such a method and apparatus would improve enabling two or more distinct computing environments to share a common integrity security module.

The embodiments of the present specification have been developed in response to the present state of the art, and in particular, in response to the problems and needs in the art that have not yet been fully solved by currently available dual-environment computing devices. Accordingly, the embodiments have been developed to provide a method and apparatus for sharing an integrity security module in a dual-environment computing device that overcome many or all of the above-discussed shortcomings in the art.

The apparatus is provided with a plurality components and modules. The apparatus include an integrity security module, one or more processors, a detection module and a regeneration module. The one or more processors may have access to the integrity security module and may operate in two distinct operating environments of a dual-environment computing device. The detection module may detect, during an initialization sequence, a power state transition of an operating environment of the dual-environment computing device. The regeneration module may regenerate one or more integrity values from a stored integrity metric log in response to detecting the power state transition of the operating environment of the dual-environment computing device.

In one embodiment, the two operating environments share a single integrity security module. In a further embodiment, the power state transition includes a transition from a low-power quiesced state of a second operating environment of the dual-environment computing device initiated in response to a switch from a first operating environment to the second operating environment.

In one embodiment, the apparatus includes a boot detection module detecting, during the initialization sequence, an initial boot of the operating environment of the dual-environment computing device. In one embodiment, the apparatus includes a storage module storing an integrity metric log generated by the integrity security module during the initialization sequence. The storage module may store the integrity metric log in response to the boot detection module detecting the initial boot of the dual-environment computing device. In a further embodiment, the storage module stores the integrity metric log in protected volatile memory of the dual-environment computing device.

A method is presented for sharing an integrity security module in a dual-environment computing device. In one embodiment, the method includes steps to carry out functions of the apparatus.

A computer program product is also presented for sharing an integrity security module in a dual-environment computing device with similar steps as the method described above.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
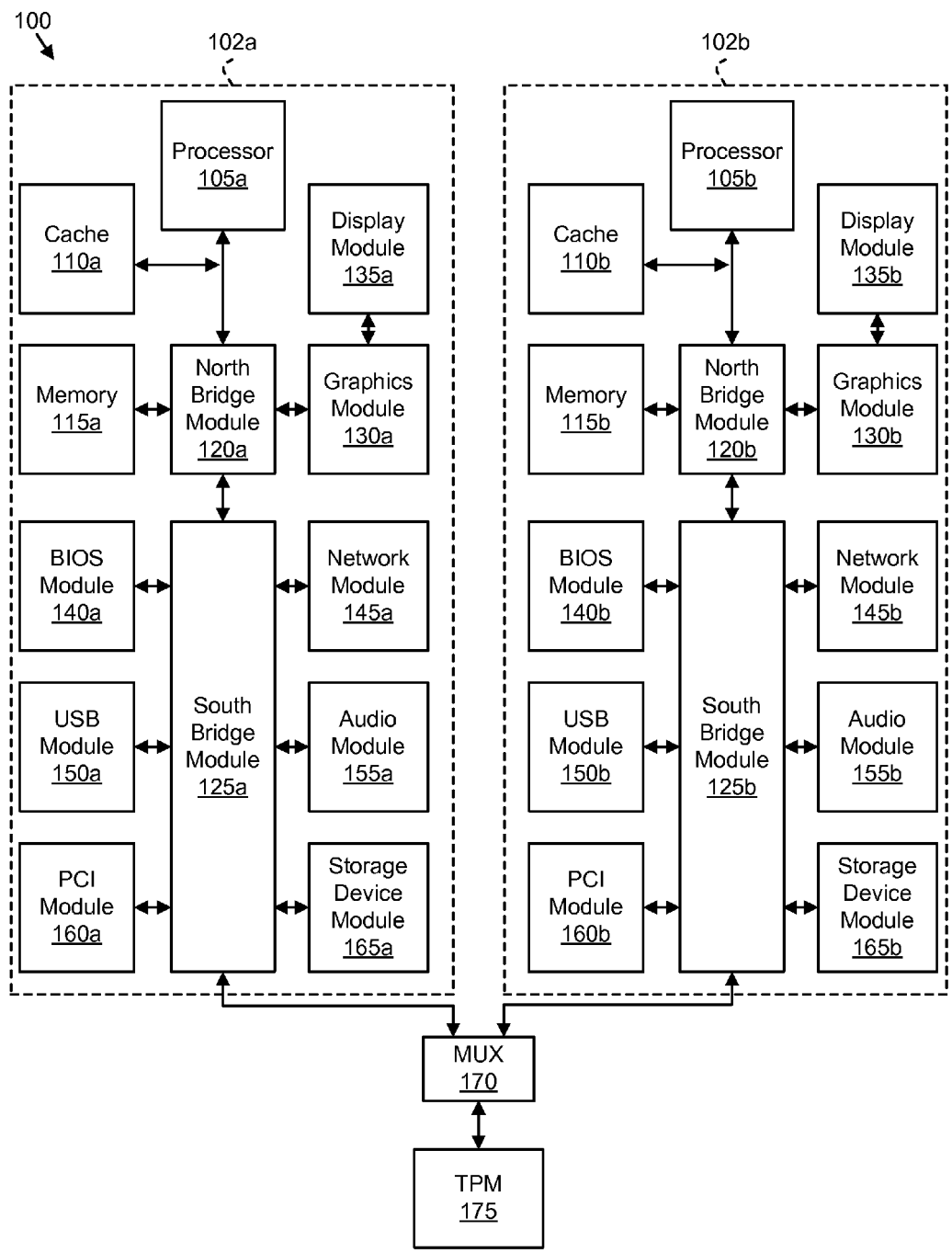
FIG. 1 is a schematic block diagram illustrating one embodiment of a dual-environment computing device.

FIG. 1 is a schematic block diagram illustrating one embodiment of a dual-environment computing device 100. The dual-environment computing device 100 includes a first operating environment 102a and a second operating environment 102b. Each operating environment 102 includes a processor 105, a cache 110, a memory 115, a north bridge module 120, a south bridge module 125, a graphics module 130, a display module 135, a basic input/output system (BIOS) module 140, a network module 145, a universal serial bus (USB) module 150, an audio module 155, a peripheral component interconnect (PCI) module 160, and a storage device module 165. Furthermore, each operating environment 102 is coupled to and/or in communication with a Trusted Platform Module ("TPM") 175 through a multiplexor 170 by way of the south bridge module 125 of each operating environment 102. One of skill in the art will recognize that other configurations of a dual-environment computing device 100 may be employed with the embodiments described herein.

The dual-environment computing device 100 may also be referred to as a hybrid computing system and may comprise an IdeaPad™ U1 Hybrid by Lenovo® or similar computing device. The dual-environment computing device 100 may comprise two or more distinct operating environments 102 integrated into a single computing device or system. As used herein, an operating environment 102 comprises a distinct, autonomous or semi-autonomous computing environment and/or interface. Each operating environment 102 may include a distinct boot environment, a distinct operating system with programs and utilities running on the operating system, and the like. Each operating environment 102 may function independent of one another or cooperatively. In one embodiment, one operating environment 102a is active at a particular moment in time while the other operating environment 102b is non-operating, in an off state or in a low-power quiesced state such as a "sleep" state.

In one embodiment, the dual-environment computing device 100 may switch between operating environments 102. For example, a user may initially boot to a first operating environment 102a and then subsequently activate a second operating environment 102b. The first operating environment 102a may enter a low-power quiesced state such as a sleep state, suspend state, or hibernate state, and the second operating environment 102b may boot and become active. After the dual-environment computing device 100 enters the second operating environment 102b, the user may switch to the first operating environment 102a. The dual-environment computing device 100 may then put the second operating environment 102b into a low-power quiesced state and load the first operating environment 102a, which transitions from its low power quiesced state to an active operating state.

In the depicted embodiment, both operating environments 102 share a common TPM 175 and each processor 105 of the dual-environment computing device 100 has access to the TPM 175. In other embodiments, each operating environment 102 may also share access to other components and modules such as the display module 135, memory 115, the storage device module 165, and the like. Although the depicted embodiment shows two operating environments 102, the dual-environment computing device 100 may include more than two operating environments 102 sharing one or more TPMs 175.

The processor 105, cache 110, memory 115, north bridge module 120, south bridge module 125, graphics module 130, display module 135, BIOS module 140, network module 145, USB module 150, audio module 155, PCI module 160, and storage device module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may be tangibly stored in the storage device module 165. The storage device module 165 may comprise at least one SSD. In addition, the storage device module 165 may include a hard disk drive, an optical storage device, a holographic storage device, a micromechanical storage device, or the like.

The processor 105 may communicate with the cache 110 through a processor interface bus to reduce the average time to access memory 115. The cache 110 may store copies of instructions and data from the most frequently used memory 115 locations. The dual-environment computing device 100 may use one or more caches 110 such as a Double Data Rate 2 (DDR2) cache memory or the like.

The north bridge module 120 may communicate with and provide bridging functionality between the processor 105, the graphic module 130, the memory 115, and the cache 110. The processor 105 may be connected to the north bridge module 120 over, for example, a 667 Megahertz (MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage device module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also comprise an expansion card as is well known to those skilled in the art.

The BIOS module 140 may communicate instructions through the south bridge module 125 to boot the dual-environment computing device 100, so that computer readable software instructions stored on the storage device module 165 can load, execute, and assume control of the dual-environment computing device 100. Alternatively, the BIOS module 140 may comprise a coded program embedded on a chipset that recognizes and controls various devices that make up the dual-environment computing device 100. In one embodiment, the BIOS module 140a for a first operating environment 102a boots the dual-environment computing device 100 into the first operating environment 102a. For example, the BIOS module 140a for the first operating environment 102a may boot the dual-environment computing device 100 into an operating system stored on the first storage device module 165a. Likewise, in one embodiment, the BIOS module 140b for a second operating environment 102b boots the dual-environment computing device 100 into the second operating environment 102b.

The network module 145 may communicate with the south bridge module 125 to allow the dual-environment computing device 100 to communicate with other devices over a network. The devices may include routers, bridges, computers, printers, and the like.

The display module 135 may communicate with the graphic module 130 to display information as will be described hereafter. The display module 135 may be a cathode ray tube (CRT), a liquid crystal display (LCD) monitor, or the like.

The USB module 150 may communicate with one or more USB compatible devices over a USB bus. The audio module 155 may generate an audio output.

The multiplexor 170 may allow the first operating environment 102a and the second operating environment 102b to share a single TPM 175 by selecting between signals to/from the first operating environment 102a and the second operating environment 102b.

The TPM 175, or Trusted Platform Module, implements system security for a computing system according to specifications of the Trusted Computing Group ("TCG"), formerly the Trusted Computing Platform Alliance ("TCPA"). The TCG maintains Trusted Computing specifications that involve client-side system security. As is known in the art, trusting computing provides for data protection, platform recognition, authorization, and the like.

The TPM 175, or other integrity security module in accordance with Trusted Computing principles, may be used to store signature and encryption keys and to measure computing system integrity. Specifically, the TPM 175 may measure software and hardware integrity in a computing device allowing a particular computing environment in the computing device to be recognizable. As a result, when a computing environment is not recognized because the integrity measurements of the TPM 175 are not consistent with a recognized environment, certain software may be restricted from operating in the unrecognized environment or access to certain data may be blocked.

In one embodiment, the TPM 175 is a hardware chip, integrated circuit, or other physical component comprising hardware or hardware and software. In another embodiment, the TPM 175 comprises executable software code stored on a computer readable storage medium. The TPM 175 is discussed in greater detail below. Although FIG. 1 depicts a TPM 175, one of ordinary skill in the art realizes that other similar integrity security modules enabling client-side security and/or implementing trusted computing may be used by the dual-environment computing device 100.

In one embodiment, each module comprises a computer readable storage medium comprising a computer readable program stored on a tangible storage device.

Figure 2:
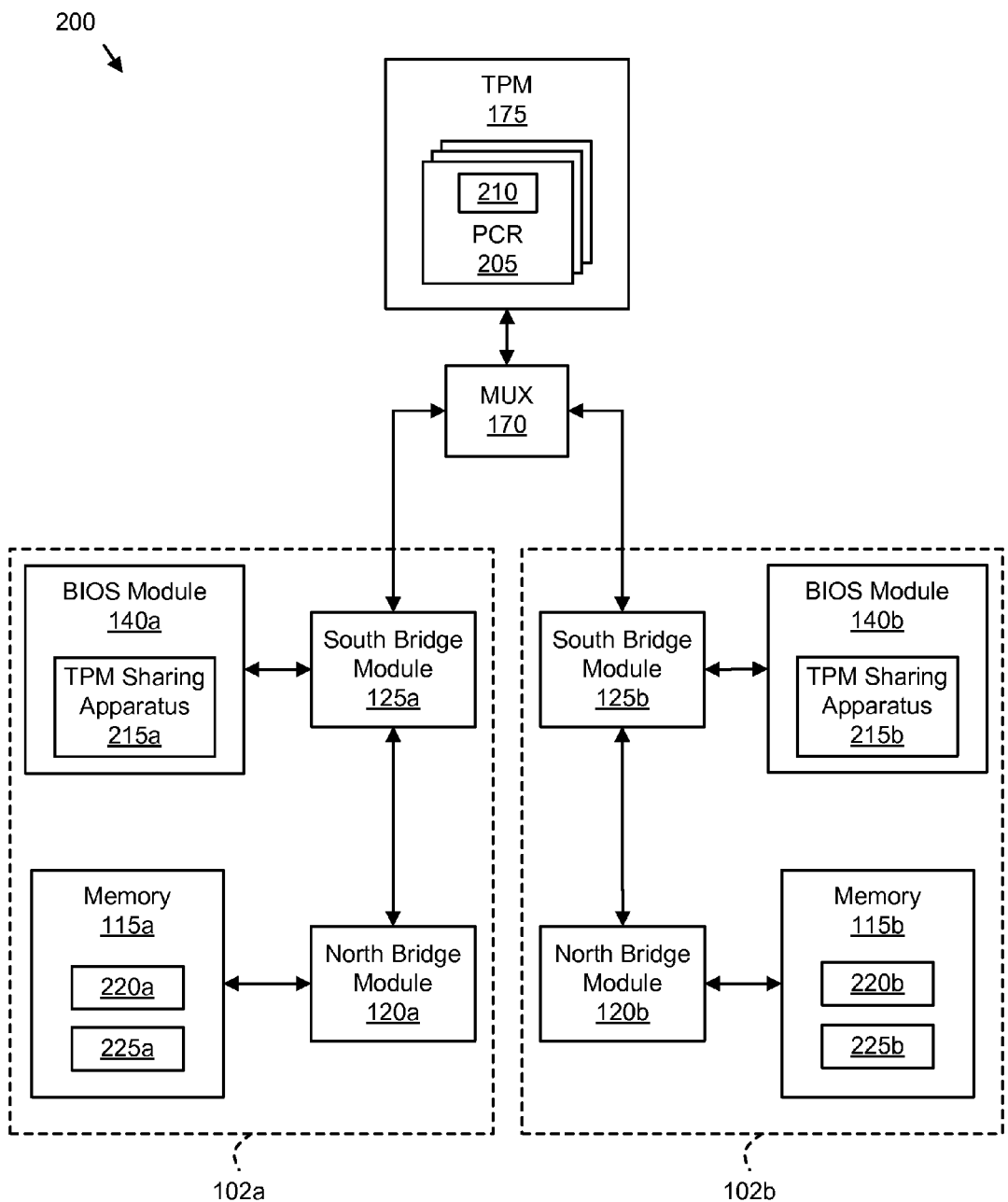
FIG. 2 is a schematic block diagram illustrating one embodiment of a system for sharing an integrity security module on a dual-environment computing device.

FIG. 2 is a schematic block diagram illustrating one embodiment of a system 200 for sharing an integrity security module 175 on a dual-environment computing device 100. The system 200 includes a Trusted Platform Module ("TPM") 175, a multiplexor 170, a first operating environment 102a with a first south bridge module 125a, a first BIOS module 140a, a first north bridge module 120a, and a first memory 115a. The system 200 also includes a second operating environment 102b with a second south bridge module 125b, and a second BIOS module 140b. The TPM 175, the multiplexor 170, each operating environment 102, each south bridge module 125, each north bridge module 120, each memory 115 and each BIOS module 140 may be similar to the TPM 175, the multiplexor 170, each operating environment 102, each south bridge module 125, each north bridge module 120, each memory 115 and each BIOS module 140 of FIG. 1. In addition, each BIOS module 140 may include a TPM sharing apparatus 215 and the TPM 175 includes a plurality of Platform Configuration Registers ("PCR"s) 205, configured to store a PCR digest value 210. Furthermore, each memory 115 may include an integrity metric log 220 and a secure integrity metric log 225.

The TPM 175, as described above, is an integrity security module, or a module that implements system security for a computing system according to specifications of the TCG. The TPM 175 may measure integrity in a computing system, giving a particular operating environment 102 in a computing system a unique signature and allowing the particular operating environment 102 to be recognizable. When the integrity measurements of the TPM 175 for a particular operating environment 102 are not consistent with a recognized operating environment 102, the particular operating environment 102 is not recognized and certain software may be restricted from operating in the unrecognized operating environment 102 and/or access may be restricted for certain data.

To measure system integrity, the TPM 175 obtains metrics of computing device characteristics at boot time and/or pre-boot time. These metrics may include measurements of executable code such as the BIOS, computing device firmware, the kernel, and the like. These metrics may also include measurements of hardware components. The TPM 175 may store an indicator of these metrics in PCRs 205 and the BIOS Module 140 can save the method used to take these measurements in an integrity metric log 220 stored in volatile memory 115.

The TPM 175 may store PCR digest values 210 in the PCRs 205. As used herein, a PCR digest value 210 is an integrity digest, or condensed representation, of one or more metrics. The TPM 175 may compute a PCR digest value 210 by hashing the concatenation of the current PCR digest value 210 with the new metric. The BIOS module 140 may make an entry in the integrity metric log 220 each time the TPM 175 extends a metric digest to a PCR 205. Each final PCR digest value 210 may result from a plurality of metrics, computed and hashed in turn and extended to the PCR 205, updating the integrity digest value 210 in the PCR 205 with each extension.

Each PCR 205 may be a non-volatile shielded storage location in the TPM 175 and/or operationally coupled to the TPM 175. Each PCR 205 may be configured to hold an integrity digest value 210. A challenger, or requester of the values 210 in the PCRs 205, may request the PCR digest values 210 to validate the operating environment 102. The TPM 175 may typically reset the PCR digest values 210 at system start-up.

By obtaining system and operating environment-specific characteristic metrics, the TPM 175 may preserve a specific "fingerprint" particular to the configuration of the operating environment 102. However, a computer system with two or more operating environments 102, such as the dual-environment computing device 100, may have different PCR digest values 210 for each operating environment 102.

As described above, the dual-environment computing device 100 may switch or transition between operating environments 102. Therefore, the PCR digest values 210 saved from one operating environment 102a may not apply to the other operating environment 102b. When each operating environment 102 shares a common TPM 175, the PCR digest values 210 may become inaccurate when switching between operating environments 102. For example, if a user switches from a first operating environment 102a to a second operating environment 102b, the dual-environment computing device 100 may cause the first operating environment 102a to enter into a low-power quiesced state and boot the second operating environment 102b. The TPM 175 may reset the PCR digest values 210 from the first operating environment 102a to zero as the TPM 175 creates the metrics and the digest values for the second operating environment 102b. In addition, when the user switches from the second operating environment 102b to the first operating environment 102a, the dual-environment computing device 100 may place the second operating environment 102b into a low-power quiesced state and transition the first operating environment 102a from its low-power quiesced state into an active operating state. The PCR digest values 210 in the TPM 175 may correspond to the second operating environment 102b, not the currently active operating environment 102 (the first operating environment 102a) thus failing to reflect the configuration of the second operating environment 102b.

Therefore, the TPM sharing apparatus 215 facilitates the sharing of a single TPM 175 between two or more operating environments 102. Specifically, the TPM sharing apparatus 215 may regenerate the PCR digest values 210 for an operating environment 102 for situations in which the operating environment 210 relies on previously computed PCR digest values 210 (such as when the operating environment 102 returns from a sleep state).

The TPM sharing apparatus 215 may store the integrity metric log 225 in a secure location for an operating environment 102 when that operating environment 102 first boots (when the integrity metric log 220 is created and the PCR digest values 210 are initially computed). By storing the integrity metric log(hereinafter referred to as the "secure integrity metric log" or "stored integrity metric log"), the TPM sharing apparatus 215 preserves the method in which the metrics for each PCR digest value 210 was obtained. Consequently, when the operating environment 102 initializes by transitioning from another power state other than an initial boot (when the PCR digest values 210 would be computed from a zero state), the TPM sharing apparatus 215 may regenerate the PCR digest values 210 from the secure integrity metric log 225 and provide PCR digest values 210 that correspond to the operating environment 102 currently active.

The dual-environment computing device 100 may then use a single TPM 175 while providing two operating environments 102 that are in compliance with the specification of the TCG. The TPM sharing apparatus 215 may also be used in other computing devices/systems which share a TPM 175 between distinct BIOS, pre-boot environments, and/or operating environments.

The TPM sharing apparatus 215 may be in communication with the BIOS module 140. In the depicted embodiment, the TPM sharing apparatus 215 resides in the BIOS module 140. The TPM sharing apparatus 215 may also reside outside of the BIOS module 140. Furthermore, in the depicted embodiment, each BIOS module 140 includes a TPM sharing apparatus 215. In this embodiment, the TPM sharing apparatus 215 on each BIOS module 140 regenerates the PCR digest values 210 for its corresponding operating environment 102. For example, a first TPM sharing apparatus 215a on a first BIOS module 140 for a first operating environment 102a may regenerate the PCR digest values 210 for the first operating environment 102a. In another embodiment, the dual-environment computing system 100 includes a single TPM sharing apparatus 215 in communication with the BIOS module 140 and/or TPM driver for each operating environment 102. In yet another embodiment, the TPM sharing apparatus 215a resides on one BIOS module 140a and not on the other BIOS module 140b. One of ordinary skill in the art realizes the variety of implementations of the TPM sharing apparatus 215.

Figure 3:
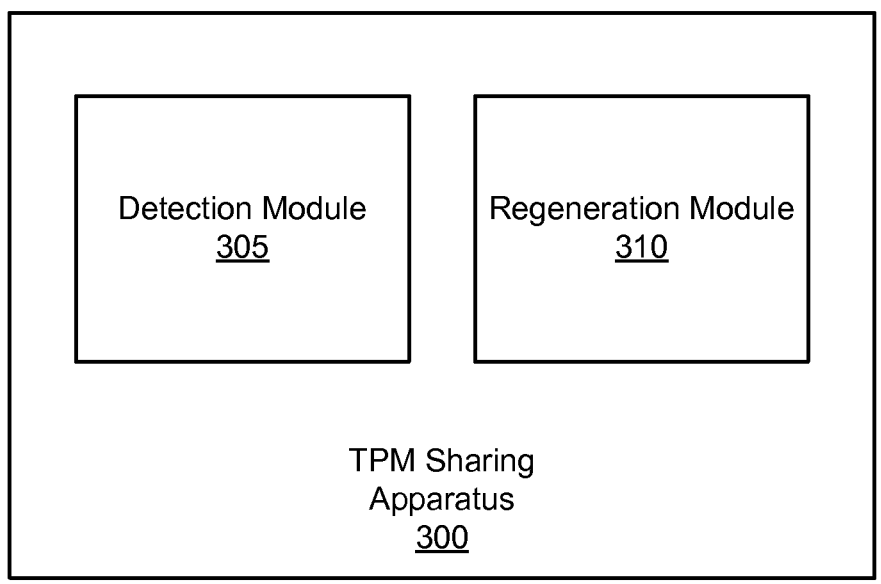
FIG. 3 is a schematic block diagram illustrating one embodiment of a Trusted Platform Module ("TPM") sharing apparatus.

FIG. 3 is a schematic block diagram illustrating one embodiment of a Trusted Platform Module ("TPM") sharing apparatus 300. The TPM sharing apparatus 300 may be the first TPM sharing apparatus 215a or the second TPM sharing apparatus 215b depicted in FIG. 2. The description of the TPM sharing apparatus 300 refers to elements of FIGS. 1 and 2, like numbers referring to like elements. The TPM sharing apparatus 300 includes a detection module 305 and a regeneration module 310.

The detection module 305 detects an initialization sequence of an operating environment 102 in which the operating environment may require PCR digest values 210, which the TPM 175 previously computed, to be regenerated. As used herein, an initialization sequence is the process of an operating environment 102 loading, becoming active, assuming control of the dual-environment computing device 100, and the like. An initialization sequence may be an initial boot sequence of the operating environment 102 on the dual-environment computing device 100. An initial boot sequence may include powering on the dual-environment computing device 100 from a powered-off state during which the TPM 175 computes the PCR digest values 210 from a zero state.

An initialization sequence may also be a power-state transition. In one embodiment, the power state transition includes a transition from a low-power quiesced state. The low-power quiesced state may be a sleep state, a standby state, a hibernate state, and the like. In one embodiment, the sleep state is an "S3" sleep state. In certain embodiments, the TPM 175 is not configured to compute the PCR digest values 210 during a power-state transition, but during an initial boot.

In one embodiment, the detection module 305 detects a power state transition of an operating environment 102 of the dual-environment computing device 100. In one embodiment, the power state transition of a second operating environment 102b of the dual-environment computing device 100 is initiated in response to a switch from a first operating environment 102a to the second operating environment 102b. Furthermore, in one embodiment, the detection module 305 detects both a power state transition of a second operating environment 102b and detects that a first operating environment 102a had previously been active on the dual-environment computing device 100 directly before the power state transition. When first operating environment 102a transitions to a second operating environment 102b, the PCR digest values 210 stored in the TPM 175 from the first operating environment 102a may not correspond to the second operating environment 102b.

In certain embodiments, both a first TPM sharing apparatus 215a and a second TPM sharing apparatus 215b each include a detection module 305. Specifically, a first detection module 305 for a first operating environment 102a may detect a power state transition of the first operating environment 102a. Furthermore, a second detection module 305 for a second operating environment 102b may detect a power state transition of the second operating environment 102b.

The regeneration module 310 regenerates one or more PCR digest values 210 from a secure integrity metric log 225. In one embodiment, the regeneration module 310 regenerates the PCR digest values 210 in response to the detection module 305 detecting a power state transition of an operating environment of the dual-environment computing device 100. In this embodiment, the detection module 310 may signal the regeneration module 310 to begin regenerating the PCR digest values 210. The regeneration module 310 may function as part of the initialization sequence as the operating environment is transitioning from a low power quiesced state.

The regeneration module 310 may restore the PCR digest values 210 to match the PCR digest values 210 stored in the TPM 175 before the operating environment 102 entered the low-power quiesced state, thus returning the integrity metrics to a corresponding operating environment 102. As described in greater detail below, the TPM sharing apparatus 215 may store the integrity metric log 220 in a secure location during an initial boot of the operating environment 102 (when the TPM 175 generates the integrity metric log 220). The regeneration module 310 may then access the secure integrity metric log 225 to regenerate the PCR digest values 210.

In certain embodiments, the regeneration module 310 regenerates a particular PCR digest value 210 by sequentially replaying metric entries from the secure integrity metric log 225 that correspond to a particular PCR 205 to be populated. The regeneration module 310 may sequentially extend each replayed metric entry to the particular PCR 205.

In one embodiment, the regeneration module 310 iterates through the secure integrity metric log 225, selecting a PCR 205 to regenerate, sequentially replaying the metric entries for the selected PCR 205 and extending each replayed metric entry to the selected PCR 205. The regeneration module 310 may replay the metric entries in chronological order to generate the final PCR digest value 210.

In one embodiment, the regeneration module 310 regenerates one or more PCR digest values 210 in response to the detection module 305 detecting both a power state transition of the second operating environment 102b and detecting that the first operating environment 102a had previously been active on the dual-environment computing device 100 directly before the power state transition.

In certain embodiments, both a first TPM sharing apparatus 215a and a second TPM sharing apparatus 215b each include a regeneration module 310 providing PCR digest value 210 regeneration for each operating environment 102a,b. Specifically, a first regeneration module 310 for a first operating environment 102a may regenerate one or more PCR digest values 210 for the first operating environment 102a. Furthermore, a second regeneration module 310 for a second operating environment 102b may regenerate one or more PCR digest values 210 for the second operating environment 102b.

Figure 4:
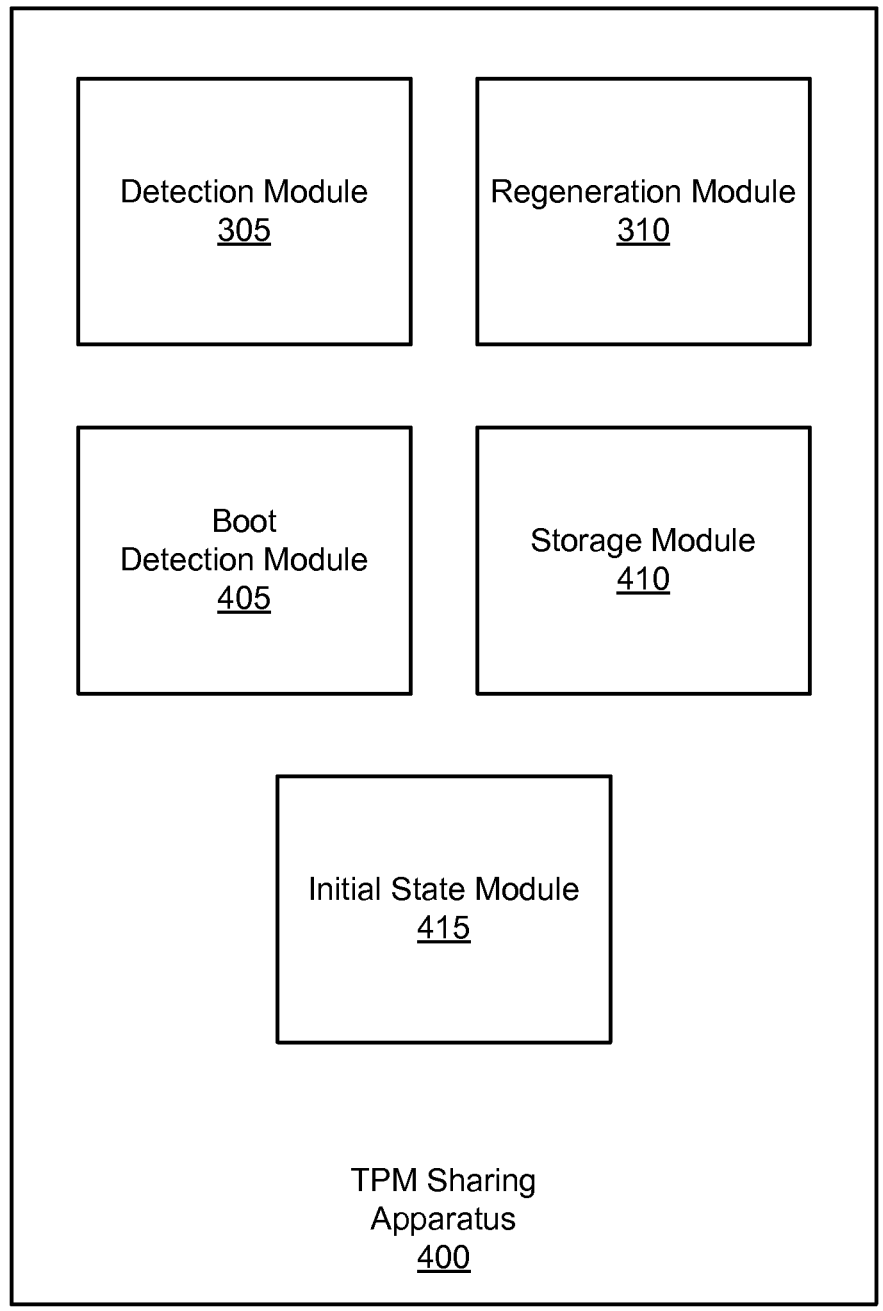
FIG. 4 is a detailed schematic block diagram illustrating another embodiment of a Trusted Platform Module ("TPM") sharing apparatus.

FIG. 4 is a detailed schematic block diagram illustrating another embodiment of a TPM sharing apparatus 400. The TPM sharing apparatus 400 may be the first TPM sharing apparatus 215a or the second TPM sharing apparatus 215b depicted in FIG. 2. The description of the TPM sharing apparatus 400 refers to elements of FIGS. 1, 2 and 3, like numbers referring to like elements. The TPM sharing apparatus 400 includes the detection module 305 and the regeneration module 310, wherein these modules include substantially the same features as described in relation to FIG. 3. In addition, the TPM sharing apparatus 400 includes a boot detection module 405, a storage module 410, and an initial state module 415.

The boot detection module 405 detects, during an initialization sequence, an initial boot of an operating environment 102 of the dual-environment computing device 110. As stated above, an initialization sequence is the process of an operating environment 102 loading, becoming active, assuming control of the dual-environment computing device 100, and the like. An initial boot sequence may include powering on the dual-environment computing device from a powered-off state during which the TPM 175 computes the PCR digest values 210 from an initial state.

Referring now to FIG. 2 and FIG. 4, both the first TPM sharing apparatus 215a on the first BIOS module 140a and the second TPM sharing apparatus 215b on the second BIOS module 140b may include a boot detection module 405. The second boot detection module 405 detects, during a second initialization sequence, an initial boot of a second operating environment 102b of the dual-environment computing device 100, the second boot detection module 405 operating in the second operating environment 102b.

The storage module 410 stores an integrity metric log 220 generated by the TPM during an initialization sequence. The storage module 410 stores the integrity metric log 220 as a secure integrity metric log 225 in response to the boot detection module 405 detecting the initial boot of the operating environment 102 of the dual-environment computing device 100. In one embodiment, the storage module 410 stores the integrity metric log 225 in protected volatile memory of the dual-environment computing device 100. In a further embodiment, the protected volatile memory comprises System Management Interrupt ("SMI") memory, or memory accessed using an SMI. Specifically, the storage module 410 may trigger an SMI to enable a high-privilege operating mode from which the storage module 410 may store the integrity metric log 225 in a protected or secure location. Storing the integrity metric log 220 in a secure location in memory 115 prevents a program or other third-party from altering or overwriting the integrity metric log 220, thus preserving the metrics in the integrity metric log 220.

Referring to FIG. 2 and FIG. 4, both the first TPM sharing apparatus 215a on the first BIOS module 140a and the second TPM sharing apparatus 215b on the second BIOS module 140b may include a storage module 405. A second storage module 405 (on the second TPM sharing apparatus 215b) may store a second integrity metric log 220 generated by the TPM 175 during an initialization sequence for the second operating environment 102b. In one embodiment, the second storage module 410 stores the second integrity metric log 220 (as a second secure integrity metric log 225) in protected volatile memory of the dual-environment computing device 100 in response to the second boot detection module 405 detecting an initial boot of the second operating environment 102b.

The initial state module 415 sets one or more PCR digest values 210 stored by the TPM 175 to an initial state. In one embodiment, the initial state is a zero state in which the PCR digest values 210 are set to zero. The initial state module 415 may set the PCR digest values 210 to the initial state before the regeneration module 310 begins regenerating the PCR digest values 210. Referring to FIG. 2 and FIG. 4, both the first TPM sharing apparatus 215a on the first BIOS module 140a and the second TPM sharing apparatus 215b on the second BIOS module 140b may include an initial state module 415.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
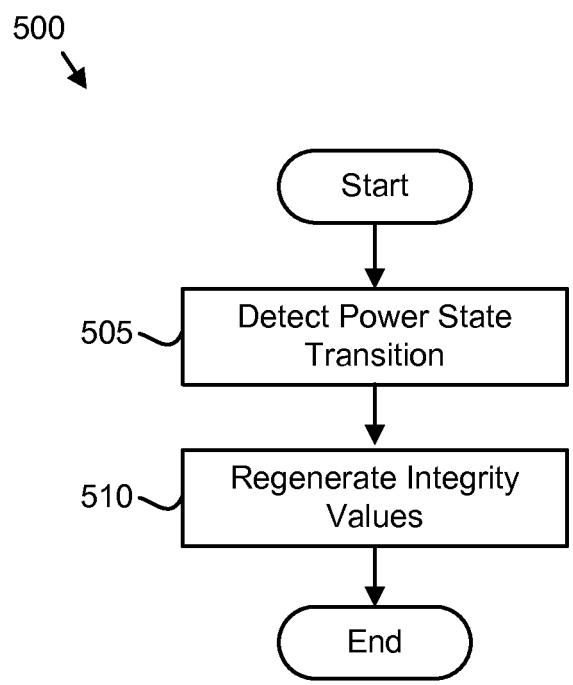
FIG. 5 is a schematic flow chart diagram illustrating one embodiment of a method for sharing an integrity security module in a dual-environment computing device.

FIG. 5 is a schematic flow chart diagram illustrating one embodiment of a method 500 for sharing an integrity security module 175 in a dual-environment computing device 100. The method 500 substantially includes the steps to carry out the functions presented above with respect to the operation of the described apparatus and system of FIGS. 1-3. The description of the method 500 refers to elements of FIGS. 1-3, like numbers referring to like elements.

In one embodiment, the method 500 is implemented with a computer readable storage medium comprising a computer readable program stored on a tangible memory device. The computer readable storage medium may be integrated into a computing system or device, such as the dual-environment computing device 100, wherein the computer readable program executed by the processor 105 performs the method 500.

The method 500 starts and the detection module 405 detects 505, during an initialization sequence, a power state transition of an operating environment 102 of a dual-environment computing device 100. The dual-environment computing device 100 includes a TPM 175 or similar integrity security module. Next, the regeneration module 410 regenerates 510 a plurality of PCR digest values 210 for the TPM 175 from a secure/stored integrity metric log 225. Then, the method 500 ends.

Figure 6:
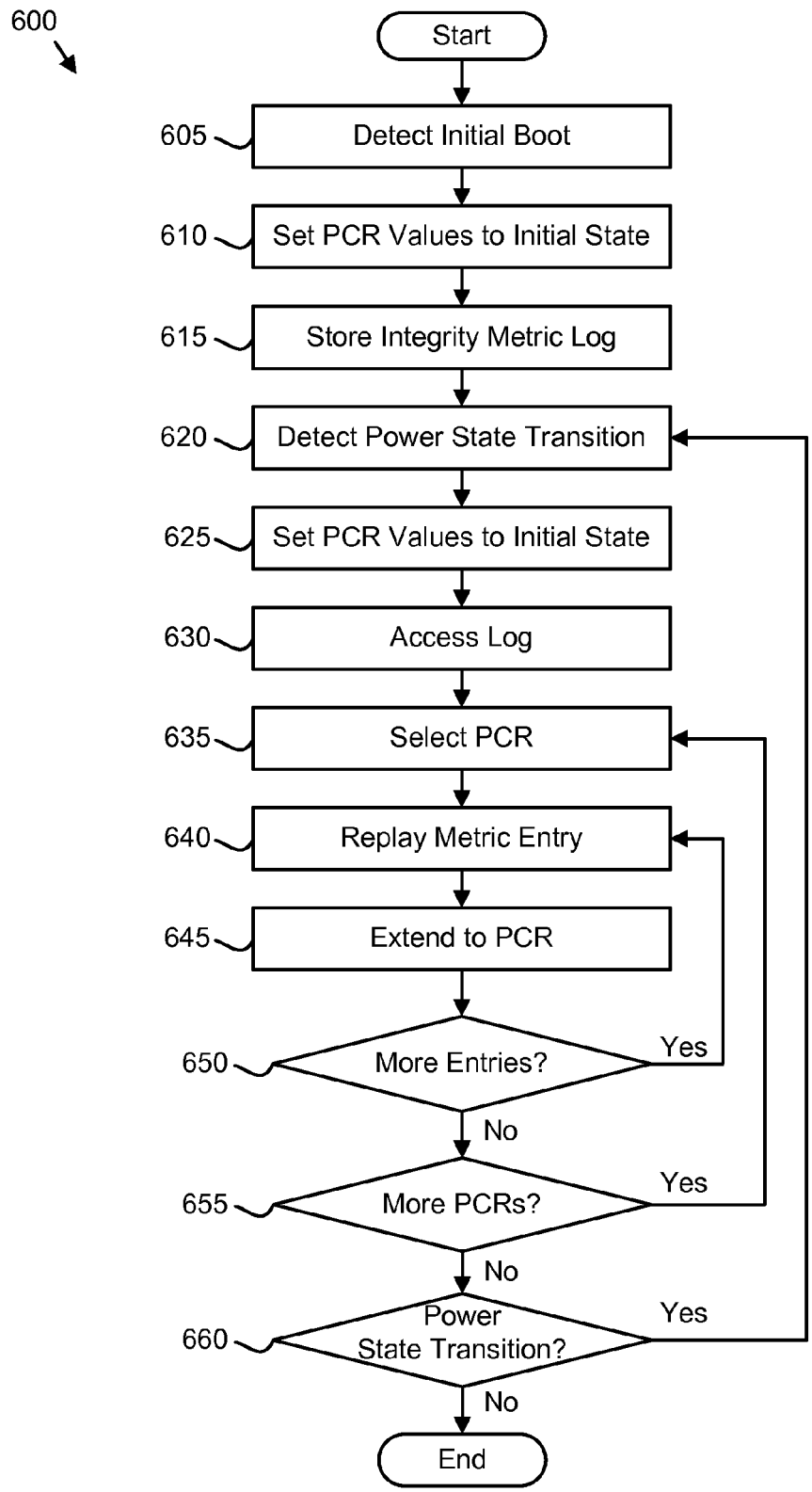
FIG. 6 is a detailed schematic flow chart diagram illustrating another embodiment of a method for sharing an integrity security module in a dual-environment computing device.

FIG. 6 is a detailed schematic flow chart diagram illustrating another embodiment of a method 600 for sharing an integrity security module 175 in a dual-environment computing device 100. The method 600 substantially includes the steps to carry out the functions presented above with respect to the operation of the described apparatus and system of FIGS. 1-4. The description of the method 600 refers to elements of FIGS. 1-4, like numbers referring to like elements.

In one embodiment, the method 600 is implemented with a computer readable storage medium comprising a computer readable program stored on a tangible memory device. The computer readable storage medium may be integrated into a computer system or device, such as the dual-environment computing device 100, wherein the computer readable program executed by the processor 105 performs the method 600.

The method 600 starts and the boot detection module 405 detects 605, during an initialization sequence of an operating environment 102, an initial boot of the operating environment 102. The operating environment 102 operates on a dual-environment computing device 100 with a TPM 175. Furthermore, the dual-environment computing device 100 may include two distinct operating environments 102 sharing a single TPM 175. The initial state module 415 then sets 610 a plurality of PCR digest values 210 stored by the PCRs 205 in the TPM 175 to an initial state.

The storage module 410 then stores 615 an integrity metric log 220 generated by the TPM 175 during the initialization sequence as a secure integrity metric log 225. For example, the storage module 410 may store the integrity metric log 220 in protected volatile memory of the dual-environment computing device 100. In one embodiment, the storage module 410 stores the integrity metric log 220 in SMI memory.

The detection module 305 detects 620, during a subsequent initialization sequence, a power state transition of the operating environment 102. For example, a user of the dual-environment computing device 100 may have switched from a first operating environment 102a to a second operating environment 102b, putting the first operating environment 102a into a sleep state. The user may then have subsequently switched back to the first operating environment 102a from the second operating environment 102b putting the second operating environment 102b into a sleep state. The detection module 305 would then detect the power state transition of the first operating environment 102a as it returned to an active state from the sleep state.

The initial state module 415 then sets 625 a plurality of PCR digest values 210 stored by the PCRs 205 in the TPM 175 to an initial state. The regeneration module 310 accesses 630 the secure integrity metric log 225 from the protected volatile memory. Next, the regeneration module 310 selects 635 a PCR 205 for which the regeneration module 310 will regenerate a PCR digest value 210.

For the selected PCR 205, the regeneration module 310 replays 640 a corresponding metric entry from the secure integrity metric log 225 and extends 645 the value obtained from replaying the metric entry to the PCR 205 in the TPM 175. The regeneration module 310 then determines 650 whether there are more metric entries for the selected PCR 205.

If more entries for the selected PCR 205 exist in the secure integrity metric log 225, the regeneration module 310 determines 650 that there is another metric entry for the selected PCR 205, and the regeneration module 310 again replays 640 a corresponding metric entry from the secure integrity metric log 225 and extends 645 the value obtained from replaying the metric entry to the PCR 205. The regeneration module 310 replays 640 and extends 645 each metric entry for a selected PCR 205 until all metric entries have been replayed and the PCR digest value 210 in the PCR 205 is restored to the original PCR digest value 210 computed when the operating environment 102 booted up initially before entering the sleep state.

When the regeneration module 310 has iterated through all of the corresponding metric entries, the regeneration module 310 determines 650 that no more entries are associated with the selected PCR 205. The regeneration module 310 then determines 655 whether there are any more PCRs 205 to regenerate. If more PCRs 205 require regeneration, the regeneration module 310 selects 635 another PCR 205. The regeneration module 310 replays 640 metric entries and extends 645 the value obtained from replaying the metric entry to the selected PCR 205 and repeats the steps of replaying 640 and extending 645 for each metric entry for the selected PCR 205. The regeneration module 310 replays 640 metric entries and extends 645 obtained values for each PCR 205 to be restored.

When the regeneration module 310 determines 650 that no more PCRs 205 need to be regenerated and the dual-environment computing system 100 undergoes no further subsequent power state transitions, the method 600 ends. However, if a subsequent power state transition occurs 660, the method 600 returns to the step of the detection module 620 detecting 620 the power state transition and the method 600 continues through steps 625 through 660. Therefore, the PCRs 205 may be regenerated in response to a power state transition subsequent to an initial boot, or in response to a second power state transition subsequent to a first power state transition (occurring at some point after an initial boot). These steps and corresponding modules may be implemented on both operating environments 102 of the dual-environment computing device 100. Consequently, a user may switch from a first operating environment 102a of the dual-environment computing device 100 to a second operating environment 102b and then from the second operating environment 102b back to the first operating environment 102a, the PCRs 205 regenerated with each transition.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an integrity security module;
   one or more processors having access to the integrity security module and operating in two distinct operating environments of a dual-environment computing device, the two distinct operating environments having been booted, the two distinct operating environments sharing specific registers of the integrity security module, wherein one or more of the specific registers are used to store integrity values for both of the two distinct operating environments;
   a detection module detecting a switch between one of the two distinct operating environments and another of the distinct operating environments, the switch comprising one of the two distinct operating environments entering a low-power quiesced state and another of the two operating environments assuming control of the dual-environment computing device; and
   a regeneration module regenerating one or more of the integrity values from a stored integrity metric log and updating the integrity values in the one or more shared specific registers, the integrity values for the operating environment assuming control of the dual-environment computing device, the regeneration in response to the detection module detecting the switch of the operating environment of the dual-environment computing device.

2. The apparatus of claim 1, wherein the switch comprises a transition from a low-power quiesced state of a second operating environment of the dual-environment computing device initiated in response to a switch from a first operating environment to the second operating environment.

3. The apparatus of claim 1, further comprising,
   a boot detection module detecting, during the initialization sequence, an initial boot of the operating environment of the dual-environment computing device; and
   a storage module storing an integrity metric log generated by the integrity security module during the initialization sequence, the storage module storing the integrity metric log in response to the boot detection module detecting the initial boot of the operating environment of the dual-environment computing device.

4. The apparatus of claim 3, wherein the storage module stores the integrity metric log in protected volatile memory of the dual-environment computing device.

5. The apparatus of claim 3, wherein the boot detection module and the storage module operate in a first operating environment, the apparatus further comprising,
   a second boot detection module detecting, during a second initialization sequence, an initial boot of a second operating environment of the dual-environment computing device, the second boot detection module operating in the second operating environment; and
   a second storage module storing a second integrity metric log generated by the integrity security module during the second initialization sequence, the second storage module storing the second integrity metric log in protected volatile memory of the dual-environment computing device in response to the second boot detection module detecting the initial boot of the second operating environment, the second storage module operating in the second operating environment.

6. The apparatus of claim 1, further comprising an initial state module setting one or more integrity values stored by the integrity security module to an initial state.

7. The apparatus of claim 1, wherein the regeneration module regenerates an integrity value by sequentially replaying metric entries from the stored integrity metric log and sequentially extending each replayed metric entry to a secure register operationally coupled to the integrity security module.

8. The apparatus of claim 1, wherein the integrity security module comprises a Trusted Platform Module ("TPM") storing each integrity value in a Platform Configuration Register ("PCR"), respective PCRs comprising one of the one or more shared specific registers, each integrity value comprising a PCR digest value.

9. A method comprising:
   detecting, during an initialization sequence, a power state transition of an operating environment of a dual-environment computing device comprising a Trusted Platform Module ("TPM"), the operating environment entering a low power quiesced state, another operating environment of the dual-environment computing device assuming control of the computing device in response to the initialization sequence, operating environments of the computing device having been booted and having access to the TPM, the operating environment and the another operating environment sharing specific registers of the TPM, wherein one or more of the specific registers are used to store integrity values for respective operating environments of the dual-environment computing device;
   regenerating a plurality of integrity values from a stored integrity metric log in response to detecting the power state transition of the operating environment of the dual-environment computing device, the integrity values for the another operating environment assuming control of the computing device; and
   storing the integrity values in the shared specific registers.

10. The method of claim 9, wherein the power state transition comprises a transition from a low-power quiesced state of a second operating environment of the dual-environment computing device initiated in response to a switch from a first operating environment to the second operating environment.

11. The method of claim 9, further comprising
   detecting, during the initialization sequence, an initial boot of the operating environment of the dual-environment computing device; and
   storing an integrity metric log generated by the TPM during the initialization sequence, wherein the integrity metric log is stored in response to detecting the initial boot of the operating environment of the dual-environment computing device.

12. The method of claim 11, wherein storing the integrity metric log comprises storing the integrity metric log in protected volatile memory of the dual-environment computing device.

13. The method of claim 9, further comprising setting a plurality of integrity values stored by the TPM to an initial state.

14. The method of claim 9, wherein regenerating the plurality of integrity values comprises sequentially replaying metric entries from the stored integrity metric log for each integrity value and sequentially extending each replayed metric entry for each integrity value to a secure register operationally coupled to the TPM.

15. A computer program product comprising a storage device storing computer usable program code executable to perform operations comprising:
   detecting, during an initialization sequence, a power state transition of an operating environment of a dual-environment computing device comprising a Trusted Platform Module ("TPM"), the operating environment entering a low power quiesced state, another operating environment of the dual-environment computing device assuming control of the computing device in response to the initialization sequence, operating environments of the computing device having been booted and having access to the TPM, the operating environment and the another operating environment sharing specific registers of the TPM, wherein one or more of the specific registers are used to store integrity values for the operating environment and the another operating environment;
   regenerating a plurality of Platform Configuration Register ("PCR") digest values from a stored integrity metric log in response to detecting the power state transition of the operating environment of the dual-environment computing device, the integrity values for the another operating environment assuming control of the computing device; and
   storing the digest values in the shared specific registers.

16. The computer program product of claim 15, further comprising
   detecting, during the initialization sequence, an initial boot of the operating environment of the dual-environment computing device; and
   storing an integrity metric log generated by the TPM during the initialization sequence, wherein the integrity metric log is stored in protected volatile memory of the dual-environment computing device and stored in response to detecting the initial boot of the operating environment of the dual-environment computing device.

17. The computer program product of claim 15, wherein regenerating the plurality of PCR digest values comprises setting a plurality of PCR digest values stored by the TPM to a zero state and sequentially replaying metric entries from the stored integrity metric log for each PCR digest value and sequentially extending each replayed metric entry for each PCR digest value to a PCR operationally coupled to the TPM.

* * * * *